United States Patent
Sasamoto

(10) Patent No.: US 8,006,040 B2
(45) Date of Patent: Aug. 23, 2011

(54) DATA STORAGE DEVICE AND METHOD THEREOF

(75) Inventor: Kyoichi Sasamoto, Hino (JP)

(73) Assignees: Kabushiki Kaisha Toshiba, Tokyo (JP); Toshiba Solutions Corporation, Tokyo (JP)

( * ) Notice: Subject to any disclaimer, the term of this patent is extended or adjusted under 35 U.S.C. 154(b) by 448 days.

(21) Appl. No.: 11/717,072

(22) Filed: Mar. 13, 2007

(65) Prior Publication Data

US 2007/0214325 A1    Sep. 13, 2007

(30) Foreign Application Priority Data

Mar. 13, 2006   (JP) ............................... P2006-067086

(51) Int. Cl.
G06F 13/00   (2006.01)
(52) U.S. Cl. ....................................... 711/137; 711/113
(58) Field of Classification Search .................. 711/213, 711/137, 113
See application file for complete search history.

(56) References Cited

U.S. PATENT DOCUMENTS

| 6,047,356 | A  | * | 4/2000  | Anderson et al. | 711/129 |
|-----------|-----|---|---------|-----------------|---------|
| 7,139,878 | B2 | * | 11/2006 | Malik et al.    | 711/137 |
| 7,370,153 | B1 | * | 5/2008  | Danilak         | 711/137 |
| 2001/0016897 | A1 | * | 8/2001 | Bates et al.   | 711/137 |
| 2007/0168610 | A1 | * | 7/2007 | Kobayshi et al.| 711/114 |
| 2007/0220208 | A1 | * | 9/2007 | Nomura et al.  | 711/137 |

FOREIGN PATENT DOCUMENTS

| JP | 04340637 A | * | 11/1992 |
| JP | 2004-355040 |   | 12/2004 |

* cited by examiner

*Primary Examiner* — Jared Rutz
(74) *Attorney, Agent, or Firm* — Finnegan, Henderson, Farabow, Garrett & Dunner, L.L.P.

(57) ABSTRACT

A microprocessor 18 in a control device 13 of a data storage device determines that the read request has a sequential access property, when a transfer size of data specified by a read request from a host computer 11 is the same as a preset pre-fetch determination size and sends the data for the read request to the host computer 11. The microprocessor 18 also reads data in succeeding areas continuous to the data designated by the read request from a storage device 12 into a cache memory 20. The data storage device enables to reduce a number of access from the control device 13 to the storage device 12, improving a response time as well as throughput of the data storage device.

23 Claims, 9 Drawing Sheets

DATA STORAGE DEVICE AND METHOD THEREOF

CROSS-REFERENCE TO RELATED APPLICATIONS

This application is based upon and claims the benefit of priority from the prior Japanese Patent Application No. 2006-067086, filed Mar. 13, 2006, the entire contents of which are incorporated herein by reference.

BACKGROUND OF THE INVENTION

The present invention relates to a data storage device and a method having a control function to perform data transmitting/receiving processing between a host computer and a storage device.

As to a storage device, there is, for example, a disk array device using a plurality of hard disk drives (HDDs). Such a data storage device has one or more storage devices, and a control device performing data transmitting/receiving processing between the host computer and the storage devices. Especially, a control device for a disk array device, which controls a plurality of HDDs with a function of redundant array of independent disks (RAID), has a cache memory capable of being accessed faster in compared to the storage device, and has a read cache function to improve access performance from the host computer as well.

In the data storage device with the read cache function, a pre-fetch function of data from the storage device has been widely used as a method for improving the access performance when sequential read requests are issued from the host computer.

The pre-fetch function of data is a function to preliminarily read data in sequential areas (succeeding areas) to be requested in the next step from the storage device into the cache memory, when it is judged that the read requests issued from the host computer has a sequential access property. The sequential access property means the read requests are continuously issued for the succeeding data areas. The control device judges whether or not the read requests issued from the host computer are ones with the sequential access property, and pre-fetch the data in the sequential areas (succeeding areas) of the storage device to the cache memory before it receives the following requests from the host computer.

The pre-fetch processing of the data provides two main advantages. One advantage is reducing a response time for the following command because the data storage device has started the reading from the storage devices before receiving the following command from the host computer. Another advantage is improving total throughput of the data storage device owing to the reduction in access time to the storage devices as well as the reduction in the response time by pre-fetching data in a certain collected size integrally. The pre-fetch processing of the data is thus a function extremely effective for improving the access performance.

FIG. 10 is an explanatory view of a conventional data pre-fetch function. It is presumed that the first command "0" is a request for reading data of a given size (for example, 256 KB) in first continuous address area. It is supposed that the second command "1" is a request for reading data of a given size (for example, 256 KB) in second continuous address area following the first continuous addresses. Further, the third command "2" is a request for reading data of a given size (for example, 256 KB) in third continuous address area following the second continuous address area. As described, in the case of receiving three consecutive data requests of the given size in the continuous addresses, the control device judges that the read requests are ones having sequential access property, and it pre-fetches the data stored in a following data area. That is, as to the determination whether or not the read requests from the host computer are the requests with the sequential access property, when the data storage device continuously receives the read requests from the host computer to the consecutive data areas more than a prescribed number of times (pre-fetch determination times), the control device determines that the read requests are ones respectively having sequential access property.

Now, a disk control device having a function with which redundant information having a predetermined length of block as a unit is added to data to be recorded into a disc drive is known. In the disk control device, a plurality of sequential data are efficiently pre-fetched and are returned to a host computer with high response by effectively using technology for adding redundant information to each sector of the disk for recording data. For instance, refer to Japanese Published Patent Application 2004-355040.

However, the conventional data pre-fetch function needs to receive the read requests from the host computer more than a prescribed number of times (pre-fetch determination times) until it is determined that the read requests from the host computer are ones having sequential access property. Therefore, the read process for the storage devices has to be repeated at every read requests.

Since it is usual to receive two or three times of requests for determining the pre-fetch, it is hard to enjoy substantial effects of the pre-fetch processing when the sequential read requests from the host computer is completed in two or three times. In other words, the disk control device determines that the read requests are ones having the sequential access property when it receives the read request two or three times, thereby performing the pre-fetch processing for the following data. However, when the read requests are completed in two or three times, the pre-fetched data is not used and results in vain, which probably deteriorates the throughput of the data storage device.

In general, a file system or an interface driver (for instance, a driver for SCSI or Fiber Channel) in the host computer does not always issue a read request having a size equal to the data size of the read request from an application software to a control device in order to respond to the read request. The read request to be issued to the control device has an upper limit for the data size depending on specifications of the file system or the driver. The host computer thus divides the read request from the application etc. into a plurality of read requests with the size within the upper limit to issue the read request to the control device.

Therefore, for example, two or three times of consecutive read requests are issued for reading out the files in such a system mostly dealing with files having a size of around 256 KB, and issuing access commands (specifically, SCSI command of "read", etc.) having such a divided size as 128 KB due to the specifications of a file system or the interface driver. In this case, the pre-fetch function does not work at all or is not effective even if it works because the pre-fetched data results in no use, if the pre-fetch determination time is set to be three or more. In actual systems, such a small number of consecutive read requests having the sequential access property are issued frequently.

Thus, it is one of the objects of the present invention to provide a data storage device and a method thereof capable of properly determining read requests having sequential access properties, and improving a response time and throughput of the data storage device as well as reducing the number of access times from a control device the storage devices.

SUMMARY OF THE INVENTION

A data storage device according to an embodiment of the invention includes a storage device having a single or a plurality of storage media storing data to be processed in a host computer; and a control device connected to the storage device and the host computer to deal with data transfer therebetween, wherein the control device further comprises; a first interface control circuit for controlling connection to the host computer, a second interface control circuit for controlling connection to the storage device, a microprocessor connected to the first and the second interface control circuits, a local memory connected to the microprocessor, and a cache memory connected to the microprocessor, wherein the microprocessor determines that a read request from the host computer has a sequential access property when a transfer size of the read request therefrom is the same as a preset pre-fetch determination size, sends data designated by the read request to the host computer, and also pre-fetches data in a storage area succeeding the data designated by the read request is stored into the cache memory.

According to another embodiment of the invention, there is provided a data storage device, wherein the preset pre-fetch determination size is a divide size peculiar to a system.

According to another embodiment of the invention, there is provided a data storage device, wherein the preset pre-fetch determination size is equal to $2^n$ KB.

According to another embodiment of the invention, there is provided a data storage device, wherein the microprocessor has a plurality of different size of the preset pre-fetch determination sizes, and it determines that the read request has a sequential access property when the transfer size of the read request from the host computer is equal to any one of the plurality of preset pre-fetch determination sizes.

According to another embodiment of the invention, there is provided a data storage device, wherein the microprocessor determines whether or not pre-fetch should be performed in response to a cache hit rate of data which has been pre-fetched into the cache memory by the host computer.

According to another embodiment of the invention, there is provided a data storage device, wherein the microprocessor varies the pre-fetch determination size in response to the hit rate of the data which has been pre-read into the cache memory by the host computer.

According to another embodiment of the invention, there is provided a data storage device, wherein the microprocessor integrally reads the data designated by the read request from the host computer and the data to be pre-fetched by issuing a read request designating data size equal to a sum of the both data to the storage device, when the microprocessor reads date from the storage device in accordance with the read request from the host computer.

According to another embodiment of the invention, there is provided a data storage device, wherein the microprocessor issues a read request with a size designated by a read request from the host computer at first to read the data into the cash memory, and then it issues a new read request designating a size of pre-fetch data to the storage device to read the pre-fetch data into the cache memory, when the microprocessor reads data designated by the read request from the host computer.

According to another embodiment of the invention, there is provided a data storage device, wherein the pre-fetch data has a size of n times as long as the pre-fetch determination size.

According to another embodiment of the invention, there is provided a data storage device, wherein the pre-fetch data size is determined in response to a data structure for a plurality of storage devices when the plurality of storage devices are managed under a redundant array of independent disks (RAID) function.

A data storage method according to an embodiment of the invention stores data to be processed by a host computer in a single or a plurality of storage media, and deals with data transfer between the host computer and the storage device through a cache memory, and the method includes steps of determining whether or not data of a read request has been read in the cache memory when the read request is issued from the host computer, sending the data to the host computer when the data of the read request is in the cache memory, determining whether or not a transfer size of the data of the read request from the host computer is the same as a preset pre-fetch determination size when the data of the read request is not in the cache memory, reading the data of the read request form the host computer into the cache memory to send it to the host computer when the transfer size of the data of the read request from the host computer is not the same as the preset pre-fetch determination size, reading data of the read request into the cache memory to send it to the host computer as well as pre-fetching data in succeeding storage area in which the data corresponding to the read request is stored from the storage device into the cache memory, when the transfer size of the data of the read request from the host computer is the same as the preset pre-fetch determination size.

A data storage method according to another embodiment of the invention stores data to be processed in a host computer in a single or a plurality of storage media, and deals with data transfer between the host computer and the storage device through a cache memory, and the method includes steps of determining whether or not data of a read request has been read in the cache memory when the read request is issued from the host computer, sending the data to the host computer when the data of the read request is in the cache memory, determining whether or not a transfer size of the data of the read request from the host computer is the same size as a preset pre-fetch determination size when the data of the read request is not in the cache memory, reading the data of the read request from the host computer into the cache memory to send it to the host computer when the transfer size of the data of the read request from the host computer is not the same as the preset pre-fetch determination size, integrally reading the data designated by the read request from the host computer and the data to be pre-fetched by issuing a read request designating data size equal to a sum of the both data to the storage device, when the microprocessor reads date from the storage device in accordance with the read request from the host computer.

According to the aforementioned embodiments of the invention, when the transfer size of the read request form the host computer is the same as the preset pre-fetch determination size, even if the read request is the first one, the data storage device determines that the read request has the sequential access property. The read request form an application, etc. is thus processed without being divided, even when the read request to the storage devices is divided into transfer size units peculiar to a file system due to specifications of the file system or an interface driver. That is, such problem to increase the number of access times from the control device to the storage devices is avoided, since the first read request from the host computer issues a read request for pre-reading the data to the control device.

DETAILED DESCRIPTION OF THE INVENTION

Figure 1:
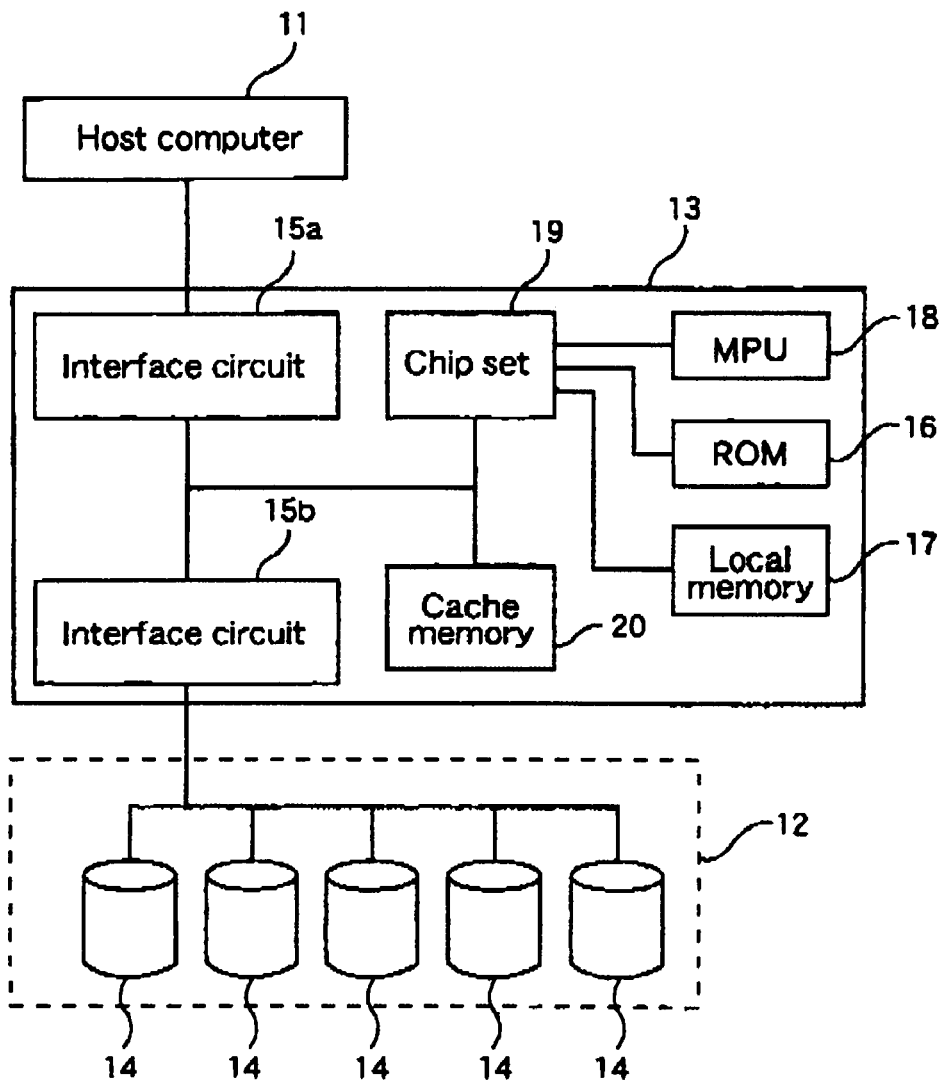
FIG. 1 is a block diagram of a data storage device according to an embodiment of the present invention.

Hereinafter, embodiments of the present invention will be described referring to the drawings. FIG. 1 is a block diagram of a data storage device according to an embodiment of the present invention. The data storage device is composed of a storage device 12 for storing data to be processed in a host computer 11, and a control device 13 for processing data transfer between the host computer 11 and the storage device 12. The storage device 12 is composed of a plurality of storage media 14 such as a hard disk drive (HDD) or an optical disk device.

The control device 13 controls the plurality of the storage media 14 in the storage device 12 to transmit and receive data to and from the host computer 11, which is connected to the host computer 11 by an interface control circuit 15a and to the storage device 12 by an interface control circuit 15b, respectively. The interface control circuits 15a and 15b are configured under the standard of the SCSI, the Fiber Channel and the like.

The control device 13 includes a nonvolatile memory (ROM) 16, a local memory 16, a microprocessor 18, a chip set 19, and a cache memory 20. A program for operating the control device 13 is stored in the ROM 16. Programs for having the control device 13 perform various types of processing is stored in the local memory 17. The local memory 17 secures a work area to be used for operating the program. That is, the microprocessor 18 executes various types of processing of the control device 13 in accordance with program codes copied in the local memory 17 from the ROM 16. The chip set 19 connects the microprocessor 18 and peripheral circuits to an inner bus. The cache memory 20 is a high speed memory, such as, a DRAM for temporally store data readout from or written into the host computer 11. It is accessible from the host computer 11 faster than the storage device 12 is accessed.

The microprocessor 18 determines whether or not transfer sizes of read requests from the host computer 11 are the same as a preset pre-fetch determination size, it determines that the read requests have sequential access properties if they are the same as one another. The microprocessor 18 then sends the data designated by the read requests to the host computer 11, and pre-reads the data in storage areas succeeding the read requests from the storage device 12 into the cache memory as well.

Here, the preset pre-fetch determination size is selected as described below. In general, the data transfer size of the read request to be issued to the control device 13 of the storage device 12 has an upper limit depending on the specifications of the file system or the driver in the host computer 11, the host computer 11 divides the read request from an application, etc., into a plurality of read requests to issue them to the control device 13 as mentioned above. The divided data sizes are selected to be one of such $2^n$ bytes as 128 KB, 256 KB, 512 KB, or 1,024 KB. Therefore, by presetting any one of such a data size as the pre-fetch determination size, the storage device 12 determines that the read request is the divided read request and pre-fetches the data, when the read request is issued requesting the transfer of data of such a size.

Figure 2:
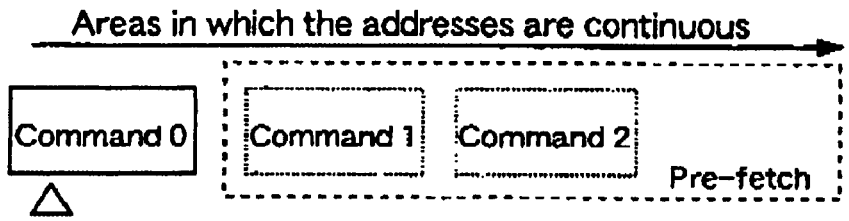
FIG. 2 is an explanatory view of basic operations of the data storage device according the embodiment of the present invention.

FIG. 2 is an view of the basic operations of the data storage device according to the embodiment of the present invention. In the embodiment, the data storage device determines whether or not the transfer size from the host computer 11 equal to the pre-fetch determination size. The data storage device, as shown in FIG. 2, determines whether or not the first read command "0" designates the data size equal to the pre-fetch determination size. If both sizes match with each other, the data storage device determines that the read request is one having a sequential access property, and pre-reads the data within a prescribed range.

In other words, the divided size specific to the file system is stored in the local memory 17 of the control device 13 as the pre-fetch determination size. When it is determined that the transfer size of the read request received from the host computer 11 is the same as the pre-fetch determination size, the microprocessor 18 of the control device 13 determines that the read request is one that has the sequential access property. The microprocessor 18 determines that it is possible to issue the read requests for the data stored in the succeeding memory areas and performs the pre-fetch processing. Therefore, an advantage of the pre-fetch processing can be obtained even when sequential read requests are repeated only a few times.

Figure 10:
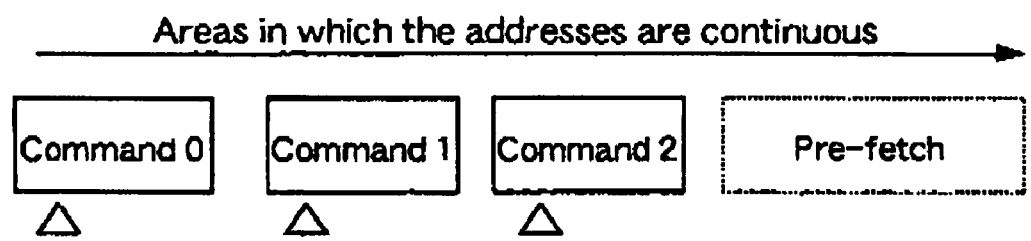
FIG. 10 is an explanatory view of a conventional data pre-fetch function.

According to the embodiment of the present invention, the conventional pre-fetch function shown in FIG. 10 may be used together with one according to the embodiment of the present invention.

That is, the control device 13 pre-fetches the data using the conventional function shown in FIG. 10, when the transfer size of the read request received from the host computer 11 is different from the pre-fetch determination size. In other words, the pre-fetch function of according to the embodiment of the present invention compensates the conventional pre-fetch function.

PIG. 3 is a flowchart depicting the pre-fetch processing in the data storage device according to a first embodiment of the present invention. At first, the microprocessor 18 of the control device 13 determines whether or not the read request hits a cache memory, namely whether or not data requested by a read request (command) is present in the cache memory 20 (S1), when it receives the command from the host computer 11. If the data requested by the command is not present in the cache memory 20, the microprocessor 18 determines whether or not the transfer size requested by the read command is equal to the pre-fetch determination size (S2). If the result of the determination shows that the transfer size is equal to the pre-fetch determination size, the microprocessor 18 reads the data of the transfer size and of the pre-fetch size from the storage device 12 into the cache memory 20 (S3). The microprocessor 18 then sends the data in the cache memory 20 to the host computer 11 (S4).

When the determination in the step S2 results in that the transfer size requested from the read command is not equal to the pre-fetch determination size, the microprocessor 18 reads the data of the transfer size from the storage device 12 in the cache memory 20 (S5) then sends it to the host computer 11 (S4). When the determination in the step S1 shows that the data requested from the read command is present in the cache memory 20, the microprocessor 18 sends the data in the cache memory 20 to the host computer 11 (S4).

As described above, the microprocessor 18 performs pre-fetch processing in addition to the processing for the read request from the host computer 11, when the transfer size of the data requested by the read command received from the host computer 11 is equal to the preset pre-fetch determination size, and when the reading from the storage device 12 is needed since the data requested is not present in the cache memory 20 (cache miss hit). The pre-fetch determination size is selected to be the same size as the divided transfer size designated by the command peculiar to the host computer. In the pre-fetch process, the data required by the read command received from the host computer 11 and the data to be pre-fetched stored in the succeeding area of the data of read command are read together from the storage device 12.

Hereinafter, the advantages is taken in consideration in the case where the microprocessor 18 reads the data from the storage device 12 more than the size of the read request from the host computer 11 by the pre-fetch size. The microprocessor 18 takes longer time to transfer the data from the storage device 12 to the control device 13 by reading the data having more size than the size of the read request from the host computer 11 by the pre-fetch size. However, in general, the access time before the start of the data transfer is longer than the time necessary for transferring the data in the storage device 12 such as a HDD. Accordingly, reducing the number of access times rather improves the total performance even if the data transfer size is increased.

Regarding this point, more specific examination will be made bellow. In the case of a HDD which is generally used now, processing times are compared between the case in which the read request for data size of 256 KB is divided into two sizes, each of 128 KB, and the case in which the read request for data size of 256 KB is processed at one time. In both cases, the access time is the sum of averaged seek time and averaged rotational latency, and is around 9 ms regardless of the transfer size. The data transfer time is around 2 ms for data size of 128 KB and is around 4 ms for data size of 256 KB data. The total processing time is the sum of the access time and the data transfer time, it takes about 22 ms if the read request is divided into two times of processing and it takes about 13 ms if the read request is treated at one time.

Accordingly, reducing the number of access times by increasing the transfer size for one time would rather decrease the total process time. If the transfer size for one time is increased too large, the microprocessor 18 cannot complete the read request from the host computer 11 until the transfer will complete, and its response time for the read request is increased. Therefore, it is preferable to select an appropriate pre-fetch size to the host computer by taking account balance between the processing time and the response time.

According to the first embodiment described, the microprocessor 18 determining whether or not the transfer size of the read request from the host computer 11 is equal to the pre-fetch determination size and that it is the read request having the sequential access property even, if the read request is the first one. Thus, it is possible to reduce the access time for the read request for the consecutive data. Further, since the microprocessor 18 reads the target data of the read request received from the host computer 11 together with the data designated by the pre-fetch command stored in the succeeding cache memory areas from the storage device 12, the data storage device may decrease the number of the read requests from the control device 13 to the storage device 12. Thereby, it is possible to reduce the access time (seek time or rotation waiting time, etc.) of the storage device 12 in total.

Figure 4:
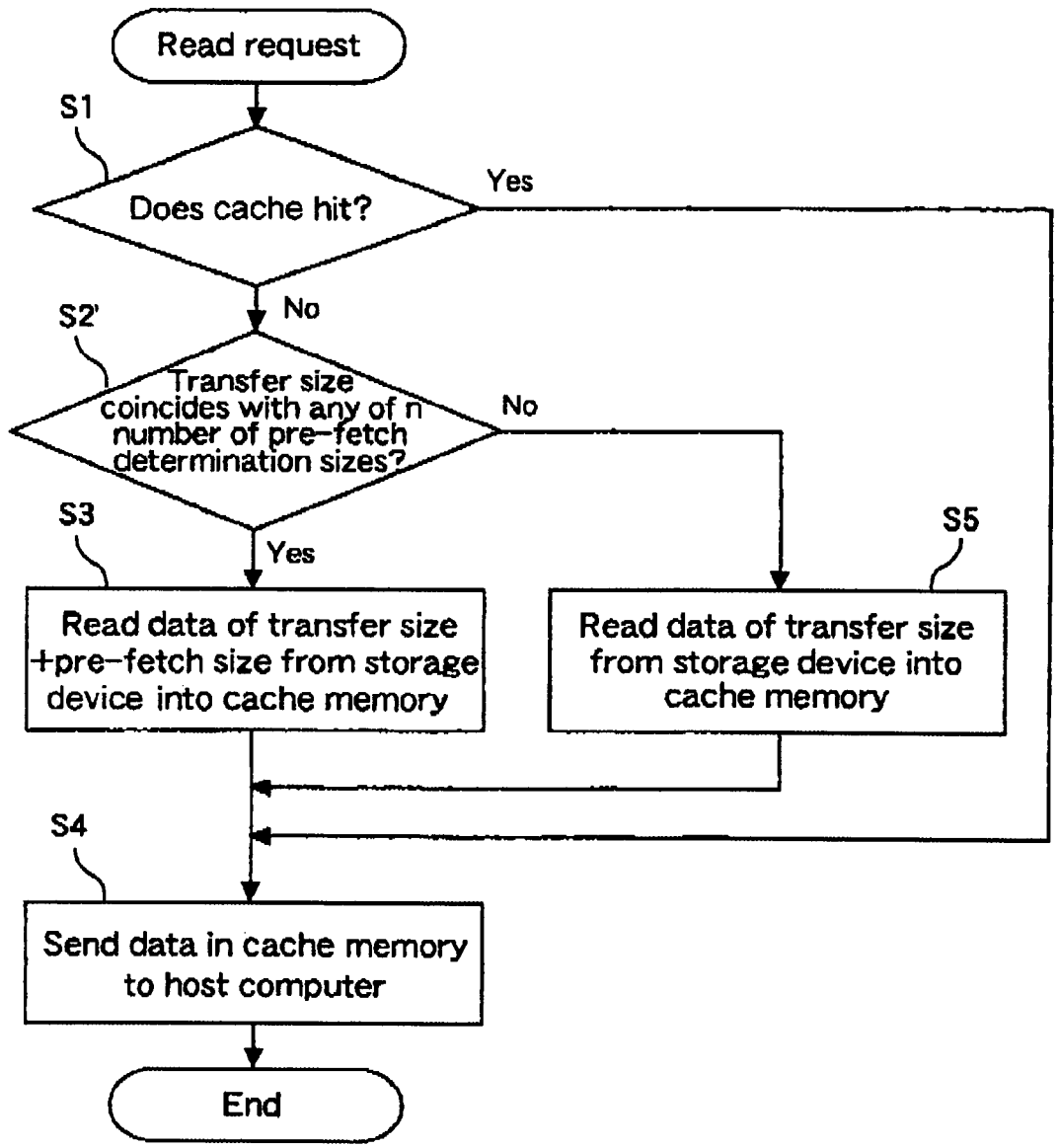
FIG. 4 is a flowchart depicting processing in the data storage device according the second embodiment of the present invention.

FIG. 4 is a flowchart illustrating the pre-fetch processing of the data storage device according to a second embodiment of the present invention. In the second embodiment, the system prepares a plurality of pre-fetch determination sizes and determines that the read requests from the host computer 11 have sequential access properties when the transfer size of the read request therefrom is equal to any one of a plurality of the prepared pre-fetch determination sizes in comparison to the first embodiment depicted in PIG. 3. The second embodiment differs from the first embodiment in that the processing in step S2 is changed to that in step S2'.

Firstly, when receiving the read request from the host computer 11, the microprocessor 18 determines whether or not the read request hits the cache (S1). When it determines that the data requested by the command of the read request is not in the cache memory 20, the microprocessor 18 then determines whether or not the transfer size of the read request from the host computer 11 is equal to any one of a plurality (n pieces) of prepared pre-fetch determination sizes (S2'). When it determines that the transfer size form the host computer 11 is equal to any one of the pre-fetch determination sizes, the microprocessor 18 reads the data, together with the data of the pre-fetch size from the storage device 12 into the cache memory 20 (S3). The microprocessor 18 then sends the data in the cache memory 20 to the host computer 11.

In the determination in the step S2', if it is determined that the transfer size requested by the read command is not equal to any of the pre-fetch determination sizes, the microprocessor 18 reads the data of the transfer size from the storage device 12 into the cache memory 20 (S5), and it sends the data in the cache memory 20 to the host computer 11 (S4). If the determining in the step S1 shows that the data requested by the command of the read request is in the cache memory 20, the microprocessor 18 sends the data in the cache memory 20 to the host computer 11 (S4).

According to the second embodiment, in addition to the advantages of the first embodiment, the advantage is obtained that it is possible to perform pre-fetch processing to the read requests having different data division sizes from each other. Because the data storage device is able to implement the pre-fetch processing when the transfer size is equal to any one of the plurality of pre-fetch determination sizes.

Figure 5:
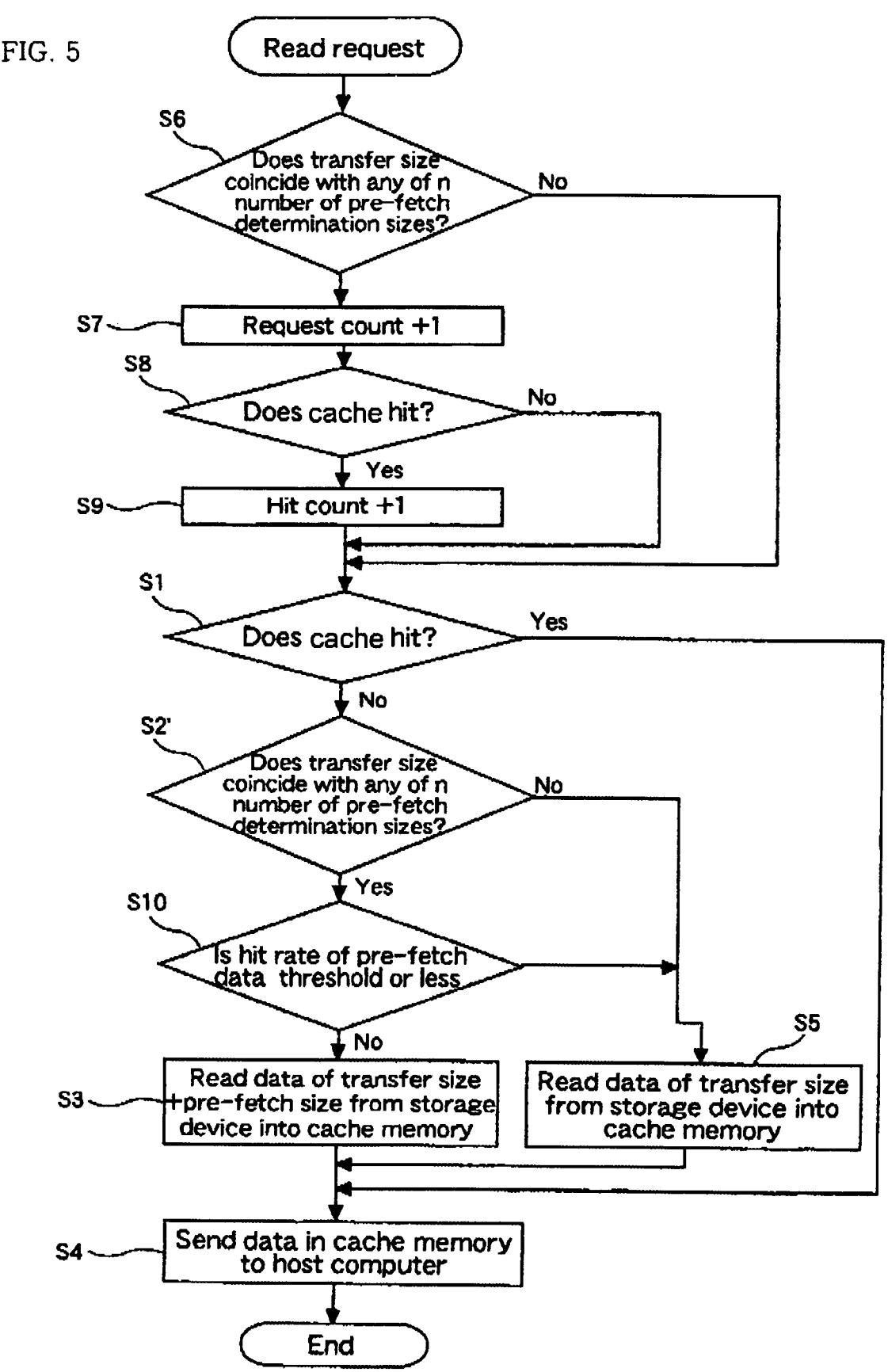
FIG. 5 is a flowchart depicting processing in the data storage device according to the a third embodiment of the present invention.

FIG. 5 is a flowchart illustrating the pre-fetch processing by the data storage device according to a third embodiment of the present invention. In the third embodiment, different from the second embodiment shown in FIG. 4, the data storage device, with steps S6 and S7 being added, determines the cache hit rate of the data pre-fetched from the host computer 11 into the cache memory 20, and performs the pre-fetch when the hit rate exceeds a threshold.

At first, when receiving the read requests from the host computer 11, the microprocessor 18 of the control device 13 determines whether or not the transfer sizes of the read requests are equal to any one of a plurality (n pieces) of preset pre-fetch determination sizes (S6). As the result, if it is determined that the transfer size is equal to any one of them, the microprocessor 18 increments a request count by +1 (7). Then, the microprocessor 18 determines whether or not the data requested from the read request commands received from the host computer 11 is present in the cache memory 20, that is, it determines whether or not the cache hit is made. As a result, if the cache hit is made, the microprocessor 18 increments a hit count by +1 (S9).

The microprocessor 18 of the control device 13 then determines again whether or not the target data of the read requests received from the host computer 11 has been of the cache hit (S1). When the microprocessor 18 determines that the data requested by the commands of the read requests is not in the cache memory 20, it determines whether or not the transfer size of the read request from the host computer 11 is equal to any one of a plurality (n pieces) of preset pre-fetch determination sizes (S2'). As the result, when it is determined that the transfer size of the read request from the host computer 11 is equal to any one of the plurality (N pieces) of the preset pre-fetch determination sizes, the microprocessor 18 determines the hit rate of the data pre-fetch from the host computer 11 into the cache memory 20 (S6). If it is determined that the hit rate exceeds the threshold, the microprocessor 18 reads the data together with the data of the pre-fetch size from the data storage device 12 into the cache memory 20 (S3). The microprocessor 18 then sends the data in the cache memory 20 to the host computer 11 (S4).

Here, the determination of the hit rate of the data pre-fetched into the cache memory 20 can be given as a ratio of a count value of the read requests counted in the step 7, which is a number of the read requests, to a hit count value counted in the step 9, which is a number of hits. Thus, the hit rate can be obtained by calculating the ratio by the microprocessor 18.

On the contrary, if it is determined in the step S2' that the transfer sizes requested by the commands of the read requests are not equal to any of the pre-fetch determination sizes, the microprocessor 18 reads the data of the transfer size from the storage device 12 into the cache memory 20 (S5), and sends the data in the cache memory 20 to the host computer 11 (S4). Also when it is determined in the step S6 that the hit rate is not more than the threshold, the microprocessor 18 reads the data by transfer size from the storage device 12 into the cache memory 20 (S5) to send the data therein to the host computer 11 (S4). Further, if it is determined in the step S1 that the data requested by the command of the read requests is present in the cache memory 20, the microprocessor 18 sends the data out of the cache memory 20 to the host computer 11 (S4).

Here, the microprocessor 18 selected whether it pre-fetches or not the data in response to the hit rate of the data which has been pre-fetched into the cache memory 20 by the host computer 11 in the embodiment described. However, the microprocessor 18 may change the pre-fetch determination size in response to the hit rate of the data which has been pre-fetched into the cache memory 20 by the host computer 11.

According to the third embodiment described, in addition to the advantages of the second embodiment, the advantage is obtained that the data storage device is able to prevent it from performing useless pre-fetch processes, since it pre-fetches the data only when the hit rate of the data which has been pre-fetched by the host computer 11 into the cache memory 20 exceeds the threshold level. More efficient pre-fetch processing may be achieved when the pre-fetch determination size is changed in response to the hit rate of the data pre-fetched into the cache memory 20.

Figure 6:
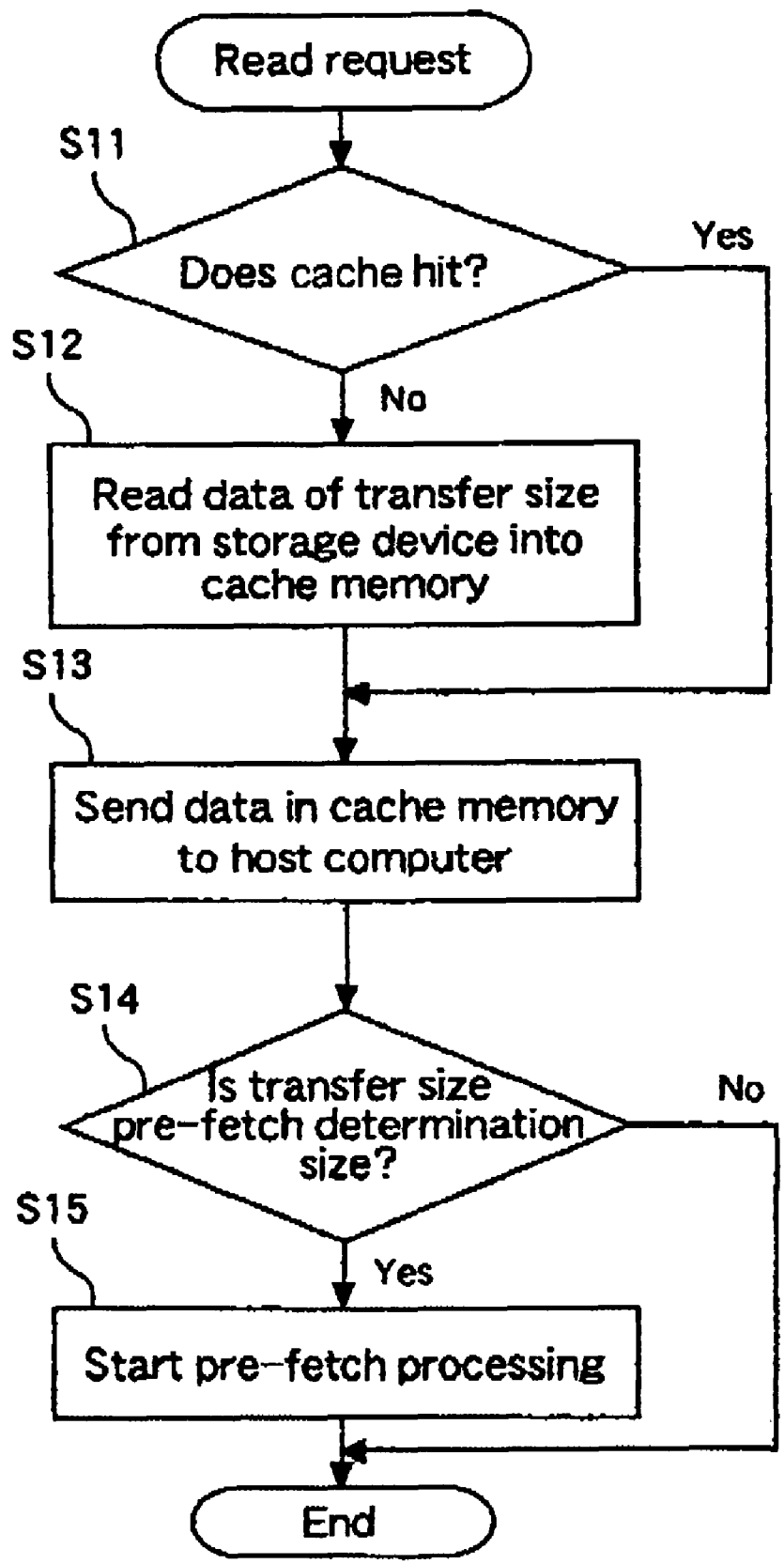
FIG. 6 is a flowchart depicting processing in the data storage device according to the fourth embodiment of the present invention.

FIG. 6 is a flowchart illustrating the pre-fetch processing in the data storage device according to a fourth embodiment of the present invention.

Figure 3:
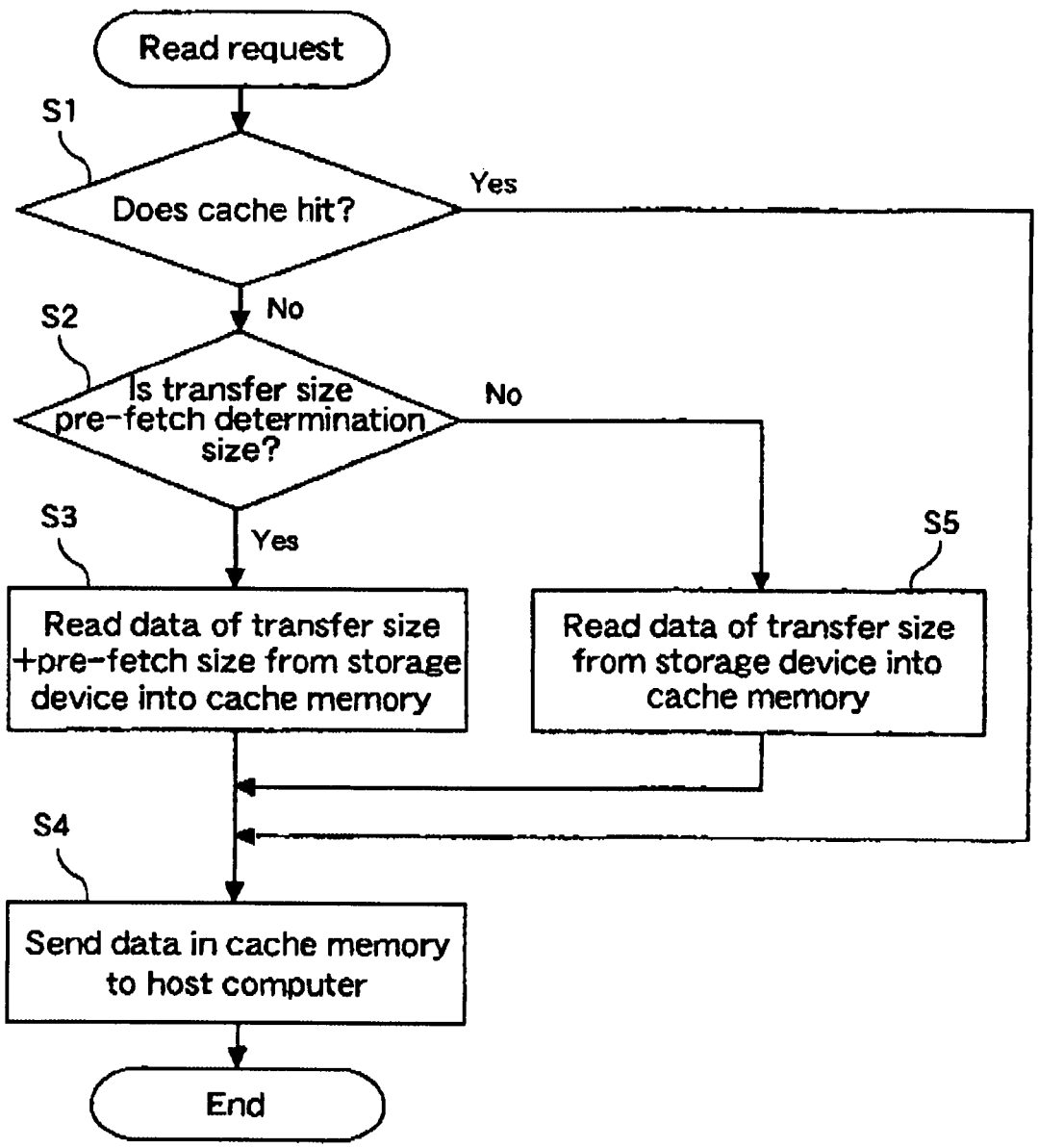
FIG. 3 is a flowchart depicting processing in the data storage device according to the first embodiment of the present invention.

In the fourth embodiment, different from the first embodiment shown in FIG. 3, the control device 13 of the storage device 12 reads a size of data designated by the read requests issued by the host computer 11 into the cache memory 20 and then, newly issues the read requests designating data with a pre-fetch sizes into the cache memory 20, in stead of reading the data with the size of the read request of the host computer 11 together with the data with the size of the pre-fetch as described in the first embodiment shown in FIG. 3.

In more detail, receiving the read request from the host computer 11, the microprocessor 18 of the control device 13 determines whether or not the read request hits the cache (S11). When it is determined that the data requested by the commands of the read requests is not in the cache memory 20, the microprocessor 18 reads the data with the size of transfer size from the storage device 12 into the cache memory 20 (S12) to send the data therein to the host computer 11 (S13).

The microprocessor 18 then determines whether or not the transfer sizes requested by the commands of the read requests are equal to the pre-fetch determination size (S14), and it starts the pre-fetch processing (S15) if the transfer size is equal to the pre-fetch determination size. The microprocessor 18 then reads the data with the size of pre-fetch from the storage device 12 into the cache memory 20 to send the data therein to the host computer 11. On the contrary, when the transfer size of the read request from the host computer 11 is not equal to any one of the plurality (n-number) of the preset pre-fetch determination sizes, the data storage device terminates the processing.

According to the fourth embodiment described, the data storage device may start pre-fetching of the succeeding areas in parallel with the sending of the data to the host computer 11 based on the first read request from the host computer 11, since the data storage device reads out the data of the pre-fetch size stored in the succeeding areas, after it reads the data of the read requests received from the host computer 11. The data storage device thus is able to perform pre-fetch processing without extending the response time of the read requests received from the host computer 11.

Figure 7:
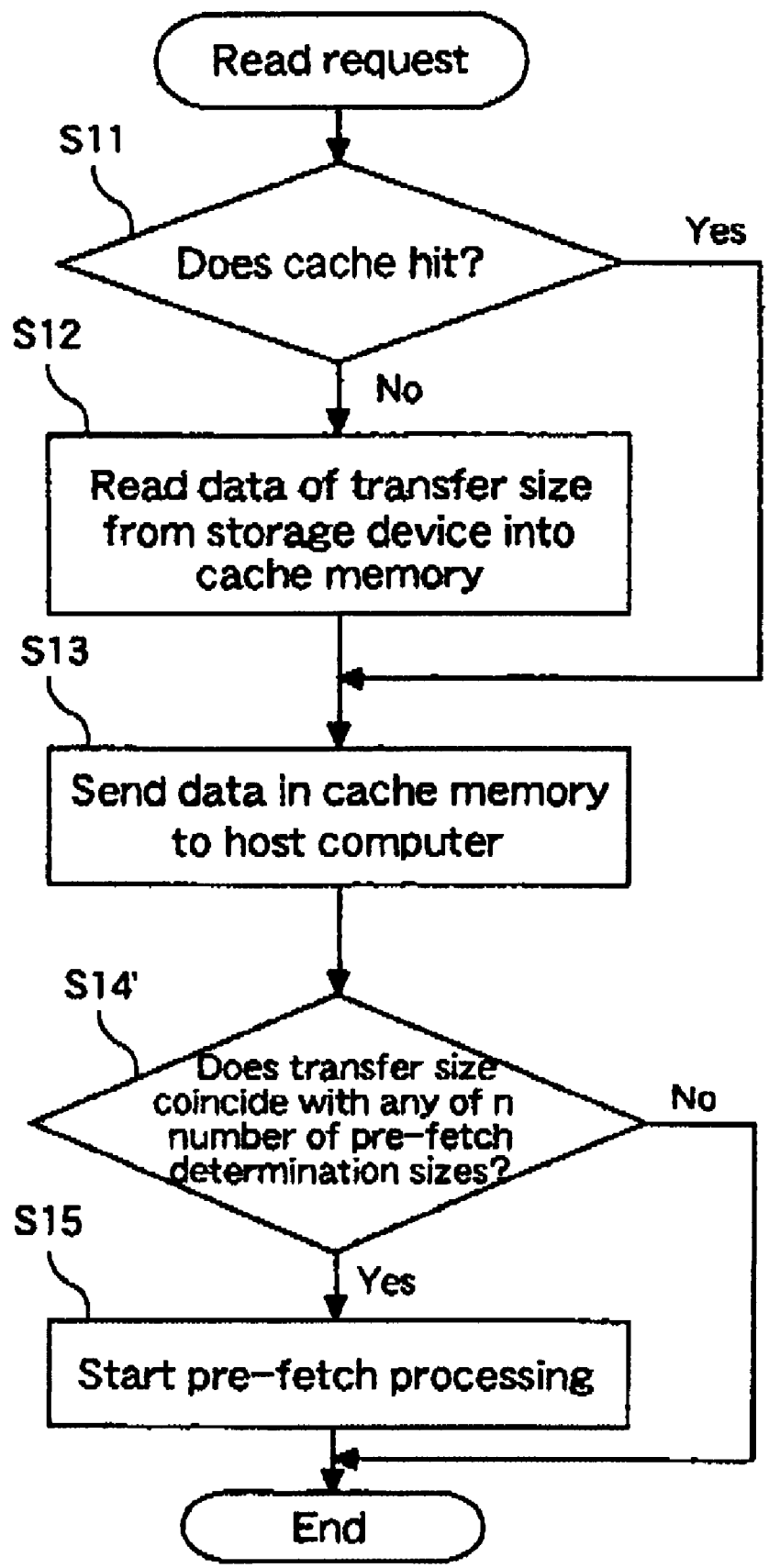
FIG. 7 is an exemplary flowchart depicting computation processing in a fifth embodiment of the data storage device regarding the embodiment of the present invention.

FIG. 7 is a flowchart depicting the pre-fetch processing in the data storage device according to a fifth embodiment of the present invention. In the fifth embodiment, different from the fourth embodiment shown in FIG. 6, the control device 13 has a plurality (n number) of pre-fetch determination sizes and it determines that the read requests have sequential access properties when the transfer size of the read request from the host computer 11 is equal to any one of the plurality of pre-fetch determination sizes prepared. The fifth embodiment is different from the fourth embodiment in the difference between the process of the step S14 and of the step S14'.

In more detail, the microprocessor 18 of the control device 13 determines whether the read request is of a cache hit or not (S11) when it receives the read request from the host computer 11. When it is determined that the data requested by the read command is not in the cache memory 20, the microprocessor reads the data of transfer size from the storage device 12 to the cache memory 20 (S12) to send the data therein to the host computer 11 (S13).

The microprocessor 18 then determines whether or not the transfer size of the read request from the host computer 11 is equal to any one of the plurality of (n number) of pre-fetch determination sizes prepared (S14'). If it is determined that the transfer size of the read request is equal to any one of the plurality (n number) of pre-fetch determination sizes prepared, the microprocessor 18 starts the pre-fetch processing (S15). The control device 13 thus reads the data with the size of the pre-fetch from the storage device 12 into the cache memory 20, and sends the data in the cache memory 20 to the host computer 11. On the contrary, it terminates the processing when the transfer size of the read request is not equal to any one of the plurality (n number) of preset pre-fetch determination sizes.

According to the fifth embodiment, in addition to the advantages of the first embodiment, the advantage is obtained that the data storage device may cover the wider range of the pre-fetch processing since the plurality of pre-fetch determination sizes are prepared for implementing the pre-fetch processing when the transfer size is equal to any one of the pre-fetch determination sizes.

Figure 8:
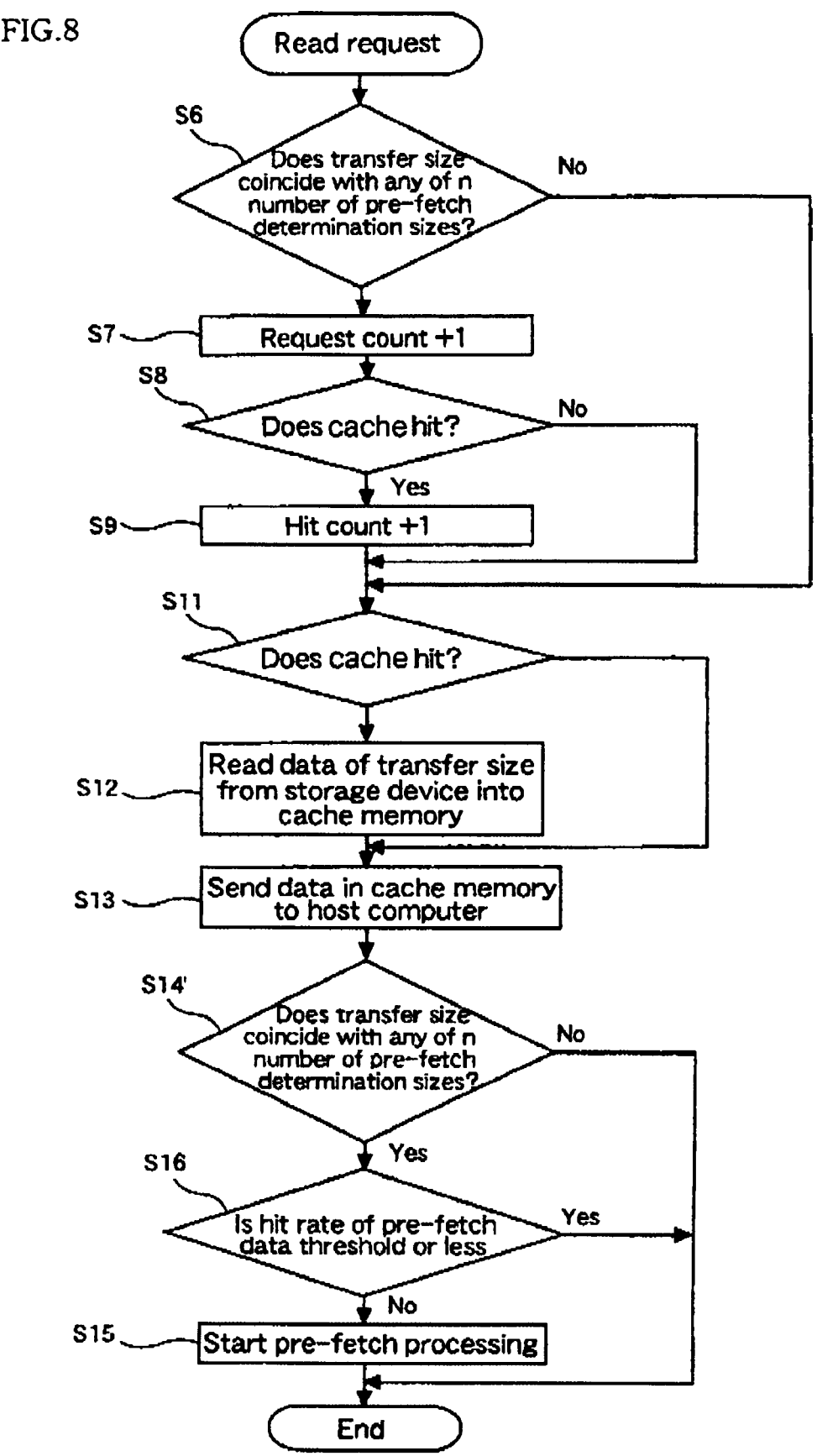
FIG. 8 is a flowchart depicting processing in embodiment of the data storage device according to the sixth embodiment of the present invention.

FIG. 8 is a flowchart illustrating the pre-fetch processing in the data storage device according to a sixth embodiment of the present invention. In the sixth embodiment, different from the fifth embodiment shown in FIG. 7, a step S16 is added to the fifth embodiment depicted in PIG. 7, the control device 13 determines the hit rate of the pre-fetch of data by the host computer 11 into the cache memory 20 and implements the pre-fetch processing when the hit rate exceeds the threshold. In FIG. 8, steps S6 to S9 necessary for calculating the hit rate shown in FIG. 5 are also added.

Now, receiving the read request from the host computer 11, the microprocessor 18 of the control device 13 determines whether or not the transfer size of the read request is equal to any one of a plurality (n number) of pre-fetch determination sizes prepared in advance (S6). When it is determined that the transfer size coincides with any one of the pre-fetch determination sizes, the microprocessor 18 increments the request counter by +1 (S7). Then, the microprocessor 18 determines whether or not the data requested by the read request received from the host computer 11 is present in the cache memory 20, namely the data is of cache hit or not. The microprocessor 18 increments the hit count by +1 if the data is not of cache hit (S9).

In the next, receiving the read request from the host computer 11, the microprocessor 18 of the control device 13 determines whether the read request is of cache hit or not (S11). When it is determined that there is no data requested by the read request in the cache memory 20, the microprocessor 18 reads the data of transfer size from the storage device 12 into the cache memory 20 (S12) and then transfers the data in the cache memory 20 to the host computer 11 (S13).

The microprocessor 18 determines whether or not the transfer size of the read request from the host computer 11 is equal to any one of a plurality of (n number) pre-fetch determination sizes prepared in advance (S14'). When it is determined that the transfer size of the read request from the host computer 11 is equal to any one of the pre-fetch determination sizes, the microprocessor 18 determines the hit rate of the data which has been pre-fetched from the host computer 11 into the cache memory 20 (S16), and it starts the pre-fetch processing when the hit rate exceeds the threshold level (S15). The microprocessor 18 of the control device 13 thereby treads the data with the size of pre-fetch from the storage device 12 into the cache memory 20 to send the data therein to the host computer 11. In the on the hand, when the transfer size of the read request from the host computer 11 is hot equal to any one of the plurality (n number) of pre-fetch determination sizes prepared in advance, the data storage device terminates the processing.

Here, the microprocessor 18 selected whether it pre-fetches or not the data in response to the hit rate of the data which has been pre-fetched into the cache memory 20 by the host computer 11 in the embodiment described. However, the microprocessor 18 may change the pre-fetch determination size in response to the hit rate of the data which has been pre-fetched into the cache memory 20 by the host computer 11.

According to the sixth embodiment described, in addition to the advantages of the fifth embodiment, the advantage is obtained that the data storage device is able to prevent it from performing useless pre-fetch processes, since it pre-fetches the data only when the hit rate of the data which has been pre-fetched by the host computer 11 into the cache memory 20 exceeds the threshold level. More efficient pre-fetch processing may be achieved when the pre-fetch determination size is changed in response to the hit rate of the data pre-fetched into the cache memory 20.

The size of the data to be pre-fetched will be "n" times as large as the sizes of the preset pre-fetch determination size. Alternatively, the size of the data to be pre-fetched will be or the size of the data is decided in accordance with an arrangement structure of the storage device 12 when the plurality of storage media 14 in the storage device 12 is controlled under the RAID function.

Figure 9:
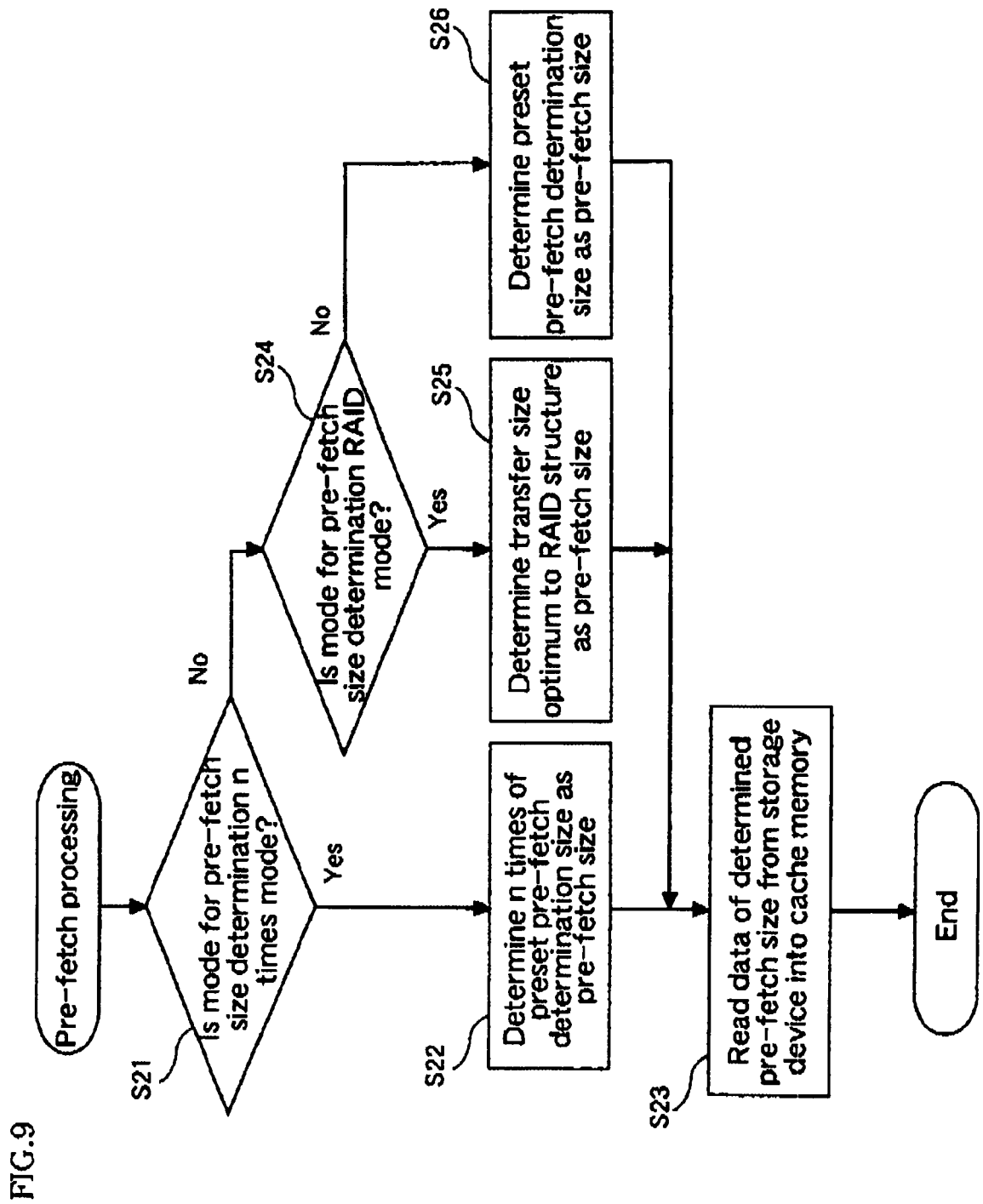
FIG. 9 is a flowchart depicting processing in the data storage device according to the seventh embodiment of the present invention.

FIG. 9 is a flowchart depicting the pre-fetch processing in the data storage device according to a seventh embodiment of the present invention. In the seventh embodiment, a plurality of modes are set for the size of the data to be pre-fetched for selecting one of the modes in performing the pre-fetch processing. In FIG. 9, a first mode is a mode in which the same size as the divided transfer size of the command peculiar to the system described above is selected as "preset pre-fetch determination size". A second mode is one in which "n times as large as the preset pre-fetch determination size" is selected as "preset pre-fetch determination size". A third mode is one in which "a size in accordance with RAID function" is selected as "preset pre-fetch determination size". This mode setting is performed by storing the mode information in the local memory 17 of the control device 13.

To start the pre-fetch processing, the microprocessor 18 determines whether or not the data size specified by the read request is equal to n times as large as the preset pre-fetch size, which corresponds to the second mode (S21). If the determination mode of the pre-fetch size is the second mode, the microprocessor 18 determines the pre-fetch size as n times of the preset pre-fetch size (S22), and reads the data of the determined pre-fetch size from the storage device 12 into the cache memory 20 (S23).

When it is determined in the step S21 that the data size designated by the read command is not equal to n times as large as the preset pre-fetch size, the microprocessor 18 determines whether or not the data size is the RAID mode, which corresponds to the third (S24). If it is determined that the preset pre-fetch size corresponds to the third mode, the microprocessor 18 determines the pre-fetch size as the transfer size optimum to the structure of the RAID (S25), and reads the data by determined pre-fetch size from the storage device 12 into the cache memory 20 (S23).

When it is determined in the step S24 that the data size designated by the read request is not corresponding to the RAID mode, the microprocessor 18 determines that the determining mode of the pre-fetch size should be the "preset pre-fetch size", which corresponds to the first mode (S26), and reads the data of determined pre-fetch size from the storage device 12 into the cache memory 20 (S23).

Here, when the size for the pre-fetch is set to n times of the preset pre-fetch determination size, the value of n is stored in the different memory area in one of the memory of the control device 13 as an optimum value for the host computer. The n is not always necessary to be peculiar to the control device 13, but may be varied per each logical volume, or may be varied depending on a way of use or a time zone.

Since the data storage device pre-reading the data of the size of n times of that of the read request from the host computer 11, if the pre-fetch size is set to be n times as large as the preset pre-fetch determination size, it enables to reduce the number of accesses to the storage device 12 up to 1/n at a maximum, if the read request from the host computer 11 is one having the sequential access property. Accordingly, the data storage device may improve the total access time.

If the data storage device is the disk array device which has been controlled by the RAID function, the user's data is stored not only in one of the plurality of the storage mediums 14 continuously but also in the plurality of the storage mediums 14 distributed in a stripe arrangement. In that case, the data is not always store in one continuous area in the storage medium 14 of the storage device 12, even when the areas seem to be continuous from the host computer 11 are. In performing the pre-fetch, it is, therefore, closely related to the data arrangement (striping) to decide how much pre-fetch size is optimal.

In general, it is a possible approach to pre-fetch the data stored in each stripe area at one time, so that a plurality of storage media 14 operate in parallel. In the storage device 12 using the RAID function, the pre-fetch size is decided by taking the striping structure of the RAID into account to seek the highest efficiency.

According to the seventh embodiment, the data storage device determines the size of the pre-fetch data to be n times as large as the preset pre-fetch determination size. Alternatively, it determines the size of the pre-fetch data taking the arrangement structure of the data in the plurality of storage media 14 into consideration, when the storage device 12 has the RAID function. The size of the pre-fetch data can be properly decided in advance for the storage device 12 to be used.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A data storage device, comprising a storage device having a single or a plurality of storage media storing data to be processed in a host computer; and a control device connected to the storage device and the host computer to control data transfer there between, wherein the control device further comprises:
  a first interface control circuit for controlling a connection to the host computer,
  a second interface control circuit for controlling a connection to the storage device,
  a microprocessor connected to the first and the second interface control circuits,
  a local memory connected to the microprocessor, and
  a cache memory connected to the microprocessor,
  wherein the microprocessor:
    determines a transfer size of a read request from the host computer, the transfer size indicating (i) an amount of data requested by the read request, and (ii) that the read request has a sequential access property;
    compares the transfer size of the read request with a preset pre-fetch determination size;
    determines that the read request has the sequential access property when the transfer size of the read request is the same as the preset pre-fetch determination size,
    stores data designated by the read request in a first storage area in the cache memory,
    sends the data designated by the read request to the host computer, and
    pre-fetches, in response to the determination that the read request has the sequential access property, data to a second storage area in the cache memory succeeding the data designated by the read request stored in the first storage area.

2. The data storage device according to claim 1, wherein the preset pre-fetch determination size is a divided size peculiar to a system.

3. The data storage device according to claim 2, wherein the preset pre-fetch determination size is equal to $2^n$ KB.

4. The data storage device according to claim 1, wherein the microprocessor has a plurality of different sizes of the preset pre-fetch determination sizes, and it determines that the read request has a sequential access property when the transfer size of the read request from the host computer is equal to any of the plurality of preset pre-fetch determination sizes.

5. The data storage device according to claim 1 or 4, wherein the microprocessor determines whether or not pre-fetch should be performed in response to a hit rate of data which has been pre-fetched into the cache memory by the host computer.

6. The data storage device according to claim 5, wherein the hit rate is determined by the microprocessor by a request count value which is incremented when the transfer size of the read request from the host computer is equal to one or n number of preset pre-fetch determination sizes, and by a hit count value which is incremented when the data of the read request from the host computer has been read in the cache memory.

7. The data storage device according to claim 5, wherein the microprocessor varies the pre-fetch determination size in response to the hit rate of the data, which is pre-fetched into the cache memory by the host computer.

8. The data storage device according to claim 7, wherein the microprocessor integrally reads the data designated by the read request from the host computer and the data to be pre-fetched by issuing a read request designating data size equal to a sum of the both data to the storage device, when the microprocessor reads data from the storage device in accordance with the read request from the host computer.

9. The data storage device according to claim 1, wherein the microprocessor issues a read request with a size designated by a read request from the host computer at first to read the data into the cache memory, and then it issues a new read request designating a size of pre-fetch data to the storage device to read the pre-fetch data into the cache memory, when the microprocessor reads data designated by the read request from the host computer.

10. The data storage device according to claim 9, wherein a size of the pre-fetch data is n-times a size of the preset pre-fetch determination size.

11. The data storage device according to claim 10, wherein the pre-fetch data size is determined in response to a data structure for a plurality of storage devices-when the plurality of storage devices are managed under a redundant array of independent disks (RAID) function.

12. A data storage method which stores data to be processed by a host computer in a single or a plurality of storage media and controls data transfer between the host computer and the storage device through a cache memory comprising the steps of:

determining whether or not data of a read request has been read in the cache memory when the read request is issued from the host computer;

sending the data to the host computer when the data of the read request is in the cache memory;

determining a transfer size of the data of the read request when the data of the read request is not in the cache memory, the transfer size indicating (i) an amount of data requested by the read request, and (ii) that the read request has a sequential access property;

comparing the transfer size with a preset pre-fetch determination size;

reading the data of the read request from the host computer into the cache memory to send it to the host computer when the transfer size of the data of the read request from the host computer is not the same as the preset pre-fetch determination size;

reading data of the read request into a first storage area in the cache memory to send to the host computer as well as pre-fetching data into a second storage area in the cache memory succeeding the first storage area when the transfer size of the data of the read request from the host computer is the same as the preset pre-fetch determination size.

13. The data storage method according to claim 12, wherein the preset pre-fetch determination size is a divided size peculiar to a system.

14. The data storage method according to claim 13, wherein the preset pre-fetch determination size is equal to $2^n$ KB.

15. The data storage method according to claim 12, wherein a microprocessor has a plurality of different size of the preset pre-fetch determination sizes, the method further comprising:

determining that the read request has a sequential access property when the transfer size of the read request from the host computer is equal to any of the plurality of preset pre-fetch determination sizes.

16. The data storage method according to claim 15, further comprising:

determining whether or not pre-fetch should be performed in response to a hit rate of data which has been pre-fetched into the cache memory by the host computer.

17. The data storage method according to claim 16, wherein the hit rate is determined by the microprocessor by a request count value which is incremented when the transfer size of the read request from the host computer is equal to one or n number of preset pre-fetch determination sizes, and by a hit count value which is incremented when the data of the read request from the host computer has been read in the cache memory.

18. The data storage method according to claim 16, further comprising:

varying the pre-fetch determination size in response to the hit rate of the data, which is pre-fetched into the cache memory by the host computer.

19. The data storage device according to claim 18, wherein the microprocessor integrally reads the data designated by the read request from the host computer and the data to be pre-fetched by issuing a read request designating data size equal to a sum of the both data to the storage device, when the microprocessor reads data from the storage device in accordance with the read request from the host computer.

20. A data storage method which stores data to be computed by a host computer in a single or a plurality of storage media, and controls data transfer between the host computer and the storage device through a cache memory, comprising steps of:

determining whether or not data of a first read request has been read in the cache memory when the first read request is issued from the host computer;

sending the data to the host computer when the data of the first read request is in the cache memory;

determining a transfer size of the data of the first read request when the data of the first read request is not in the cache memory, the transfer size indicating (i) an amount of data requested by the read request, and (ii) that the first read request has a sequential access property;

comparing the transfer size with a preset pre-fetch determination size;

reading the data of the first read request from the host computer into the cache memory to send it to the host computer when the transfer size of the data of the first read request from the host computer is not the same as the preset pre-fetch determination size; and integrally reading data designated by the first read request from the host computer and data to be pre-fetched, by issuing a second read request designating a data size equal to a sum of the data designated by the first read request and the data to be pre-fetched, when a microprocessor reads from the storage device in response to the first read request.

21. The data storage device according to claim 1, wherein the transfer size further indicates that the data of the read request is a portion of data of a larger read request.

22. The data storage method according to claim 12, wherein the transfer size further indicates that the data of the read request is a portion of data of a larger read request.

23. The data storage method according to claim 20, wherein the transfer size further indicates that the data of the read request is a portion of data of a larger read request.

* * * * *